3,156,362
LIMIT CONTROL APPARATUS

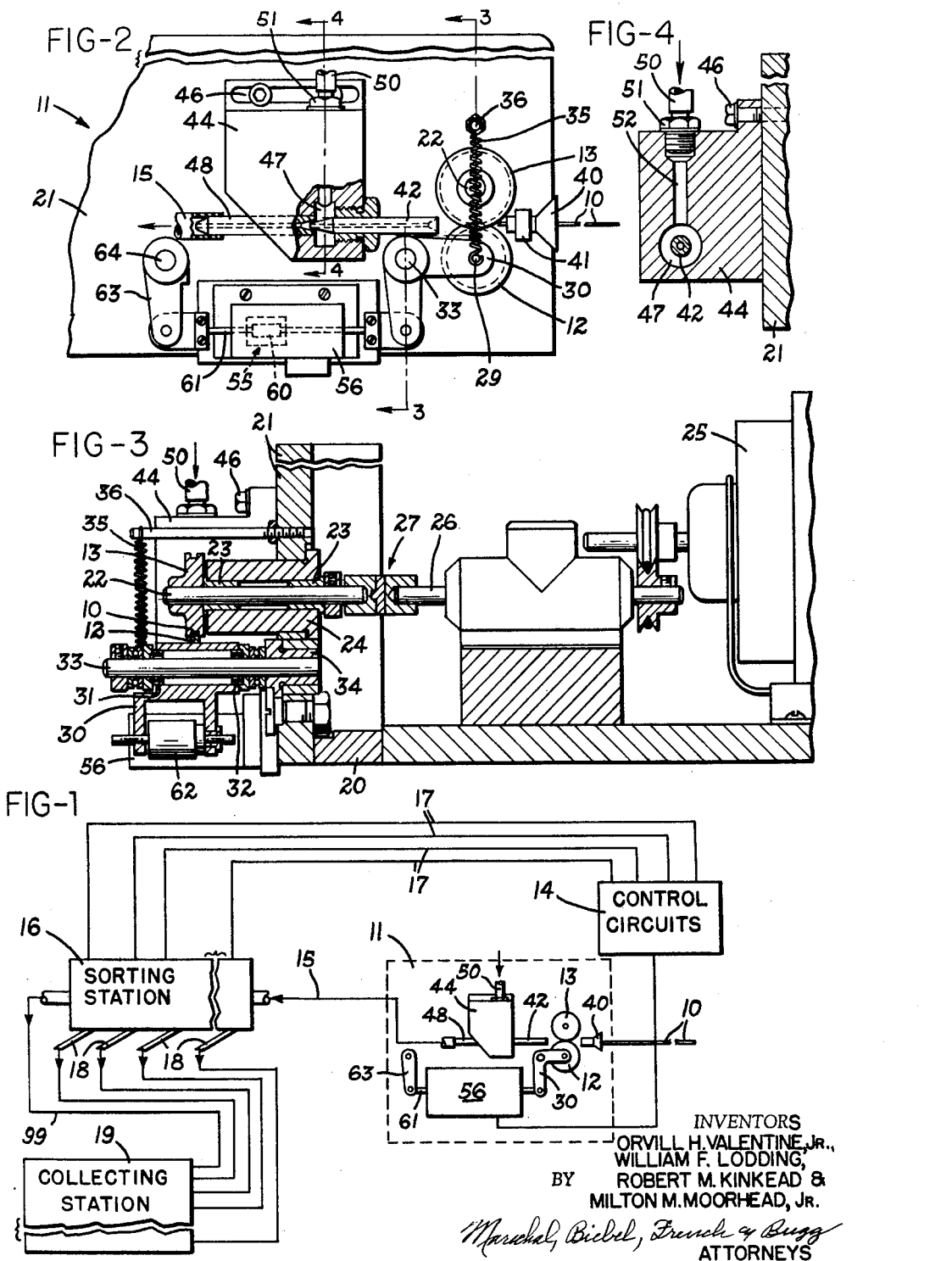

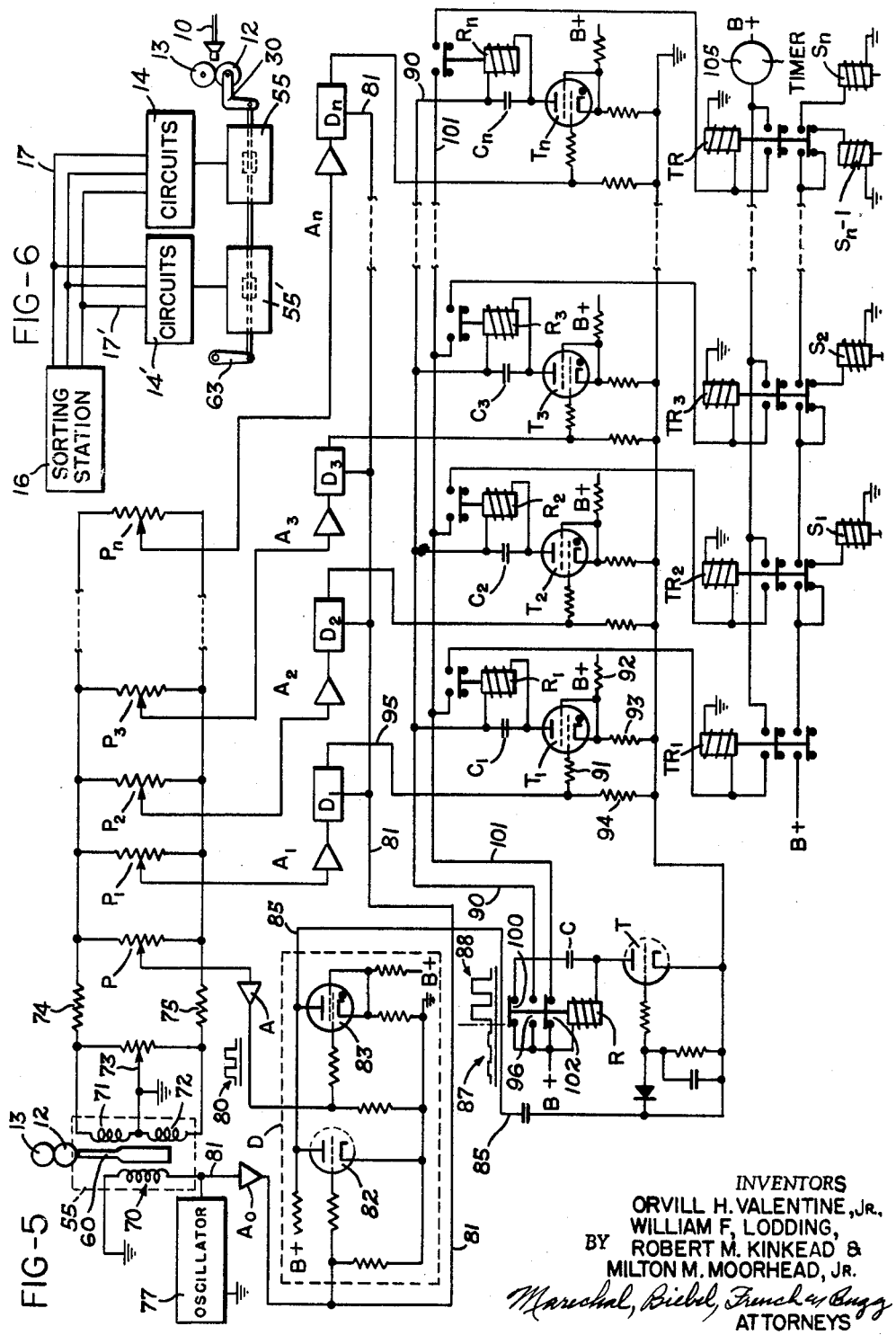

Orvill H. Valentine, Jr., Oconomowoc, Wis., William F. Lodding, Bourbonnais, Ill., and Robert M. Kinkead and Milton M. Moorhead, Jr., Dayton, Ohio, assignors to Ethicon, Inc., a corporation of New Jersey
Original application Dec. 24, 1957, Ser. No. 705,008, now Patent No. 3,023,899, dated Mar. 6, 1962. Divided and this application Feb. 16, 1962, Ser. No. 173,756
4 Claims. (Cl. 209—90)

This invention relates generally to apparatus for controlling the limits of variable conditions, and it has particular relation to apparatus for operations such as gauging, classifying, sorting and counting articles and for similar control operations on conditions having a variable dimension or other measurable property.

This application is a division of the copending application of Valentine, Jr., et al., Serial No. 705,008, filed December 24, 1957, now Patent No. 3,023,899, and assigned to the same assignee as this application.

The invention is especially adapted for use in the control of production applications such, for example, as the gauging and sorting or classifying of articles or the control of machine operations in accordance with changes in operating conditions such as dimensions, temperature, pressure or weight. In particular, the invention is characterized by utility for applications involving a plurality of control values for a limiting condition, as exemplified by the sorting of articles into multiple categories in accordance with variation over a range covering multiple limits differing by predetermined graduations, or by recycling control for a machine tool over a range of speeds in accordance with the variation of the machined dimension with respect to pre-set control values.

It is a primary object of the invention to provide control apparatus of the above type which is capable of highly sensitive operation in terms of the variations of the control condition, which is also capable of such sensitive operation at high speed without sacrificing its accuracy, and which is relatively compact as well as easily adapted to a wide variety of control conditions.

An additional object of the invention is to provide control apparatus as outlined above which requires a minimum of mechanical equipment for each particular installation and which also is comparatively independent of service conditions such as temperature, humidity and the like.

Another object of the invention is to provide control apparatus as outlined above which is quickly and easily adjustable in the field as required by the particular range of control values with which it is to be used, and especially to provide such apparatus wherein the adjustment can be made visually in direct linear relation with the control values.

These basic objects are achieved in accordance with the invention by the provision of control apparatus wherein the variable control condition is caused to vary the voltage ratio of the two legs on the first side of a Wheatstone bridge network having a plurality of second sides connected in parallel and each of different impedance ratio, and the arrangement is such that this variation causes a shift in the direction of unbalance of different ones of the bridge circuits depending on the magnitude of the variation. Provision is made for the detection of such directional shifts, and this information in turn controls the ultimate action of the apparatus, such as counting, sorting, effecting machine operations, etc.

It is a main object of the invention to provide control apparatus as outlined above which is characterized by an arrangement of multiple bridge circuits having one side in common wherein the voltage ratio of the two legs forming the common side is continually variable in response to a varying dynamic condition, and which includes provision for detecting the resulting shift in the direction of unbalance of one or more of the other sides of the bridge circuits and for utilizing this information to effect a desired operation.

Another main object of the invention is to provide control apparatus as outlined above which is especially adapted for the high speed gauging of successive moving articles in terms of a dimension thereof and for the sorting or classifying of such articles in accordance with graduated variations of the gauged dimension, and it is specifically an object of the invention to provide such apparatus incorporating multiple bridge circuits as outlined above wherein the voltage ratio of the common side of the multiple circuits is caused to vary in relation to the variation of the gauged dimension of the successive articles handled by the apparatus.

A further object of the invention is to provide gauging and classifying apparatus incorporating multiple bridge circuits as outlined above wherein one of the parallel sections of the bridge network acts as a control for the others in such manner as to initiate and to terminate the gauging actions thereof in properly coordinated relation with the passage of the successive articles.

Still further objects and advantages of the invention will be apparent from the following description, the accompanying drawings and the appended claims.

The preferred embodiment of the invention shown in the drawings and described in detail hereinafter is apparatus for the high speed gauging and classifying of successive lengths of string-like articles constituting an intermediate product in the manufacture of surgical sutures and ligatures. More specifically, there is a stage in the manufacture of such sutures at which it is desirable to ascertain the minimum diameter of each of the individual lengths of the material, which commonly are in standard lengths of five feet each, with this measurement being in fine graduations of the order of 0.003 inch or less, and to sort the measured sutures according to categories differing by such small graduations in preparation for further finishing operations, and the gauging and clarifying operations may also include measurement of maximum diameters and sorting in accordance with diameter differentials. The illustrated apparatus is particularly designed for such gauging and classifying operations at speeds as high as 1,000 feet per minute for the suture material.

In the drawing—

FIG. 1 is a diagrammatic view illustrating a complete gauging and sorting system constructed in accordance with the invention;

FIG. 2 is a detailed side elevational view of the gauging or measuring mechanism in the system of FIG. 1;

FIG. 3 is a section on the line 3—3 of FIG. 2;

FIG. 4 is a section on the line 4—4 of FIG. 2;

FIG. 5 is a wiring diagram; and

FIG. 6 is a diagrammatic view further illustrating the use of the invention.

Referring to FIG. 1, the individual suture strings 10 are initially introduced in succession to the gauging station indicated generally at 11, and as each suture passes through this station, its diameter is continuously measured in terms of the extent to which it displaces the sensing member provided by the movable guaging or anvil wheel 12 with respect to its complementary driving wheel 13 which rotates on a fixed axis. If as previously noted, the objective with this apparatus is to determine the minimum diameter of each individual suture, the gauging mechanism and its control circuits 14 are accordingly preset to detect variations in the diameter of the gauged sutures in terms of graduations of a few thousandths of an inch. The ultimate result achieved by the apparatus is then to classify the successive sutures in categories of minimum diameters with each category encompassing one such graduation, i.e., if each such graduation is 0.003 inch, the minimum diameter of all the sutures in a given category will vary only within limits of 0.003 inch and adjacent categories do not overlap.

In the operation of the apparatus, the successive sutures are conveyed from the gauging mechanism 11 by a tube 15 to the sorting or classifying station 16, which may be of the structure shown in Schwartz Patent 2,791,329 or of the structure shown in the application of William F. Lodding, now Patent No. 3,023,896, filed of even date herewith and assigned to the same assignee as this application. During the passage of each suture through the wheels 12–13, each time the gauging mechanism and its control circuits detect a minimum diameter falling within a category lower than any previously detected for the specific suture being gauged, a temporary record is made thereof. At the conclusion of the passage of the suture between the wheels 12–13, this information is employed to control the operation of the sorting station 16, as indicated diagrammatically by the lines 17, in such manner as to direct the individual sutures by way of conveyor tubes 18 to the proper chambers in the collecting or receiving station 19, which may also be of the construction shown in the above Schwartz patent.

The structure of the gauging mechanism 11 is shown in detail in FIGS. 2–4, and it includes a base plate 20 to which is secured the upright mounting plate 21 for supporting the moving parts of the unit. The driving wheel 13 is secured on a drive shaft 22 which is journaled by bushings 23 in a housing 24 threaded or otherwise secured in the mounting plate 21. The shaft 22 is driven by a drive motor 25 as shown in FIG. 3, the motor shaft 26 and drive shaft 22 being coupled at 27.

The driving wheel 13 has its periphery of channeled section to receive the periphery of gauging wheel 12, and the successive sutures 10 are fed between these interfitting wheels to displace them to the extent of the diameter of each suture. The gauging wheel 12 is mounted for free rotation on a shaft 29 in one pair of arms of the bell crank 30 which is mounted by bearings 31 and 32 on a shaft 33 supported on mounting plate 21 in cantilevered position by a bushing 34. A coil spring 35 is connected between the wheel shaft 29 and a pin 36 projecting from the mounting plate 21 to bias the bell crank 30 in counterclockwise direction as viewed in FIG. 2 toward the position of contact between the gauging wheels 12 and 13.

The individual sutures are initially guided to the nip of the wheels 12–13 by a suitable funnel member 40 mounted on the plate 21 by a bracket 41. On the outgoing side of the nip, the sutures enter a tube 42 projecting from a fixture or block 44 adjustably mounted on plate 21 by the bolts and slots indicated at 46. The discharge end of tube 42 extends into a chamber 47 within block 44 and projects partly within the tapered inlet end of a second tube 48 which projects beyond block 44 and is connected directly with the conveyor tube 15. The successive sutures are conveyed through this tube 15 to the sorting station 16 by pressure air which is continuously supplied to the chamber 48 by a supply tube 50 connected at 51 with a bore 52 in block 44 communicating directly with the chamber 47.

The displacement of the diameter-sensing wheel 12 as each suture passes between wheels 12–13 causes rocking of the bell crank 30, and this movement is in turn converted into linear adjustment of a suitable mechanical-electrical transducer, such as the core of a linearly variable differential transformer indicated generally at 55 and carried by a housing 56 secured to the mounting plate 21. The transformer core 60 is secured on a rod 61 pivoted at opposite ends by frictionless mounting 62 in the lower pair of arms of the bell crank 30 and a link 63 having a mounting 64 on the plate 21 similar to that of the bell crank 30. This linkage arrangement therefore maintains the core 60 horizontal through its full range of movement, which need not be greater than the maximum suture diameter of the order of 0.040 inch.

The operation of the transformer 55 is illustrated in the wiring diagram in FIG. 5, which corresponds to the control circuits 14 in FIG. 1. As shown, the transformer includes a primary coil 70, and its secondary coils 71 and 72 are connected in series aiding, with their center tap grounded and also provided with a phase adjustment at 73. The secondary coils 71 and 72 are connected in circuit through end resistors 74 and 75 with a plurality of adjustable voltage dividers, shown as potentiometers $P$, $P_1$, $P_2$, $P_3$ and $P_n$, to form a plurality of bridge circuits each having the coils 71–72 in common to form the first side thereof and with the second side of each thereof including one of the potentiometers $P–P^n$. The number of these circuits may be selected at will in accordance with the number of categories into which the sutures are to be sorted, and the several potentiometers are adjustable to provide a different impedance ratio in each of the resulting plurality of bridge circuits.

In operation, a common potential difference is impressed across all of these bridge circuits by means such as an oscillator 77 connected with the transformer primary coil 70. The voltage ratio of the secondaries 71–72 is variable in accordance with the position of the core 60, and if the magnitude of this variation is sufficient, the direction of unbalance in one or more of the bridge circuits will change. Therefore, if the several potentiometers $P–P_n$ are adjusted in such relation that their respective impedance ratios differ progressively from each other by appropriate graduations, the direction of unbalance in each of the bridge circuits will change in response to a different displacement of the core 60 by the gauging wheel 12, i.e., each circuit will have a specific null point corresponding to a specific position of the core 60 determined by the setting of the related potentiometer, and the output signal therefrom will undergo a 180° phase shift as the circuit passes through its null point.

Further as to this portion of the wiring diagram, the gauging wheel 12 cooperates with transformer 55 to cause the voltage ratio in the common side of the several bridge circuits to vary in linear relation with the movement of the transformer core 60 by the wheel 12, and the transformer 55 also offers practical advantages of range and sensitivity as the transducer in the system of the invention over other variable voltage dividers capable of use therein. This transducer arrangement can therefore be employed to actuate the system in response to sensing of a wide variety of continuously variable dimensions or other conditions, and in the present example, the potentiometers $P–P_n$ may be so adjusted that the null point in each bridge circuit will occur whenever the spacing of the wheels 12–13 drops below a different predetermined control value which lies within the range of values being gauged and which corresponds to a specific diameter of a suture 10. Thus if the maximum suture diameter is approximately 0.040 inch, the potentiometer $P_1$ may be set for a null point at 0.038 inch, and the potentiometers $P_2–P_n$ set at progressively lower values differing by suitable graduations such as .002–.004 inch, with the potentiometer $P_n$ representing the smallest measured useful diameter. The potentiometer $P$ performs a special function described hereinafter.

The invention provides means in the control circuits for detecting and indicating the progressive violations of the null point of the several bridge circuits. More specifically, the output signal from each of the potentiometers $P–P_n$ is supplied to an associated squaring amplifier $A–A_n$ of a conventional construction characterized by very high gain and a limitation of its output signal. Thus each amplifier $A–A_n$ amplifies its input sine wave voltage considerably (several hundred thousand times), but due to its limiting action, it cuts off the greater part of the resulting wave form and passes what approximates a square wave form, shown at 80 above the output line leading from the amplifier A. A squaring amplifier $A_0$ is connected in the output line 81 from the oscillator 77 to provide a similar square wave reference signal, although the amplifier $A_0$ need not be of the same power as the amplifiers $A-A_n$ since its input signal is initially much stronger than that of the other squaring amplifiers.

The output of each amplifier $A-A_n$ is supplied to a phase sensitive discriminator $D-D_n$ or coincidence amplifier each of which is also connected with the line 81 from the oscillator 77 and its squaring amplifier $A_0$. These phase discriminators may be of any type known in the art capable of comparing the signals received from the associated bridge circuit squaring amplifier and the reference signal from the oscillator 77 and amplifier $A_0$ and of transmitting through the output line thereof a train or burst of positive pulses only when the first and second inputs are in predetermined phase relation. A satisfactory circuit for this purpose is shown at D as including a triode tube 82 such as one-half a type 12AU7 and a gas tetrode thyratron tube 83, such as a type 2D21 and similar circuits may be employed in the phase discriminator $D_1-D_n$.

In the operation of the invention, it is desired that each phase discriminator transmit a positive pulse signal when the related dimensional value of its bridge circuit has been violated, i.e. when the displacement of the gauging wheel 12 is lower than the setting of its related potentiometer, and therefore that no signal be transmitted when the displacement of the wheel 12 is greater than the related dimensional value. These two possible output conditions for the output line 85 of the phase discriminator are represented above a portion of the line 85. As shown at 87, this signal is of substantially no magnitude when the two input signals from the squaring amplifiers A and $A_0$ are in phase, but when the phase shift occurs in the output of the amplifier A as its bridge circuit passes its null point, the two inputs are out of phase and a signal 88 of substantial magnitude is transmitted on the line 85.

The response of the detecting means for each bridge circuit provided by the amplifiers $A_1-A_n$ and phase discriminators $D_1-D_n$ is indicated by an associated circuit capable of temporarily recording or storing this information, and illustrated in FIG. 5 as including thyratron tubes $T_1-T_n$, such as type 2D21. Referring to the bridge circuit containing the potentiometer $P_1$, and assuming that the common plate line 90 is connected to a suitable B+ source, so long as no signal is received from its phase discriminator $D_1$, the thyratron $T_1$ is held non-conducting by the illustrated resistor bias network, in which the resistors 91 and 92 may each have values of 100,000 ohms, and the resistors 93 and 94 may have values of 10,000 and 470,000 ohms respectively. However, when a positive pulse is transmitted from the output line 95 of its phase discriminator $D_1$, the tube $T_1$ will fire and will therefore energize its associate relay $R_1$. The condenser $C_1$ connected in parallel with the coil of relay $R_1$ provides a short delay in the closing of the relay after the tube fires, as well as a similar delay in the opening of the relay after the tube is extinguished.

The remaining storage circuits, incorporating thyratron tubes $T_2-T_n$ and their associated relays $R_2-R_n$ and condensers $C_2-C_n$ as shown, are the same in operation as the storage circuit just described, the only difference being that they operate in response to progressively smaller measured control values of suture diameter. The total number of storage circuits which respond during passage of a given suture through the wheels 12-13 indicates the minimum diameter of that suture and determines the category into which it is classified. Before this phase of the operation is considered, however, it should be noted that provision must be made to establish operating intervals for the detecting and indicating actions of the storage circuits corresponding to the passage of each suture through the gauging wheels, and the bridge circuit which includes the potentiometer P is employed for this function as now described.

The tube T is a triode, shown as one-half a 12AU7, which is connected with the output line 85 of discriminator circuit D to form a gate circuit controlling the operation of the thyratron storage circuits. More specifically, the potentiometer P is preset to balance at a value substantially lower than the potentiometer $P_n$ and only slightly greater than zero, for example corresponding to a transducer displacement of 0.001 inch. This bridge circuit will therefore pass its null point as soon as the wheels 12-13 begin to separate as a suture enters the gauging nip. In addition, the circuit for tube T is such that when the wheels 12-13 are in their zero position of contact, the tube will be held non-conducting by the negative bias on its grid as shown, but as soon as the gauging wheels separate beyond the setting of potentiometer P, the resulting pulse from phase discriminator D will permit the tube T to conduct and thereby to energize its plate relay R. The operation of the tube T is therefore the reverse of that of the thyratron tubes, since the tube T conducts when the spacing of the gauging wheels is greater than the setting of the potentiometer P, whereas the thyratron tubes fire under the reverse conditions. It is the closing of relay R which connects the B+ supply, through its front contacts 96, to the common plate line 90 of the thyratron tubes.

As already noted, the thyratron storage circuits control the operation of the sorting station 16, and this action is illustrated in FIG. 5 by the series of transfer relays $TR_1-TR_n$. The arrangement is shown as such that if only the tube $T_1$ is fired by a given suture, only the relay $TR_1$ will be closed, and this will complete an energizing circuit through the back contacts of relay $TR_2$ to a solenoid $S_1$ which represents, for example the solenoid air valve 73 in the above Lodding application or the solenoid A3 in the above Schwartz patent reversed to open its associated gate A2 instead of closing it. Similarly if both of tubes $T_1$ and $T_2$ fire, the solenoid $S_2$ will be energized through closed front contacts of relays $TR_1$ and $TR_2$ and back contacts of relay $TR_3$ and so forth. If none of the thyratron tubes fire, the suture is oversized and conveyed through the sorting station to the line 99 leading to the reject category in the collecting station. In an alternative arrangement, the transfer relays $TR_1-TR_n$ might correspond directly to the solenoids A3, B3, etc. in the Schwartz patent, in which event the solenoids $S_1-S_n$ could be eliminated.

*Operating Cycle*

A complete operating cycle or interval starts with the entry of a suture to the nip of gauging wheels 12-13 and ends when the trailing end of the suture leaves this nip. At the start, before the suture enters the nip but with power on from the starting switch (not shown), the gauging wheels will be in their contact or zero position, and therefore all bridge circuits will be in the condition to fire their associated thyratron tubes. However, this does not occur because the triode T is held non-conducting by the negative bias on its grid, and since its plate relay R is therefore not energized and its contacts 96 are open, there is no power available on line 90 to the thyratron plate circuits. The sorting relays SR are similarly all open.

As soon as the leading end of a suture starts into the nip of wheels 12-13, the wheels quickly separate beyond the minimum spacing setting of the gate circuit including potentiometer P. The gate triode T therefore immediately becomes conducting and closes the energizing circuit for its relay R, but the latter preferably does not actually close for an interval long enough to insure full opening of the gauging wheels to a spacing approximately equal to the mean diameter of the suture. The normal closing delay of the relay may be adequate, or the condenser C may be provided to insure this result, with condenser C being connected in parallel with the relay R through back contacts 100 of relay R so that the condenser has no effect on the subsequent opening of the relay when it is deenergized. Since the tube T continues to conduct so long as the spacing of the gauging wheels is greater than the setting of its related potentiometer P, the relay R similarly remains closed.

At this stage, power is available to all the thyratron plate circuits, but none of these tubes fire so long as the diameter of the suture is greater than the highest setting of any of the potentiometers, which in this example is assumed to be the potentiometer $P_1$. If now the wheel 12 encounters a location in the suture where the diameter is less than the setting of potentiometer $P_1$, the direction of unbalance in the $P_1$ bridge circuit will change, the phase of the signal transmitted by the squaring amplifier $A_1$ will shift 180°, and the resulting positive pulse signal from the phase discriminator $D_1$ to the grid of thyratron $T_1$ will permit the latter to fire. The relay $R_1$ will therefore close, after the short delay for charging the condenser $C_1$, and it will remain closed for the balance of the cycle because thyratron $T_1$ remains in a conducting state to store the record of the detected reduced diameter of the suture. However, the closing of relay $R_1$ will not yet have any effect, since there is as yet no power on the line 101 to its closed front contacts because this line is broken at the back contacts 102 of relay R.

The actions of each of the remaining bridge circuits if additional smaller diameters occur in the suture are the same as just described for the $P_1$ circuit. Thus if the wheel 12 senses successively smaller diameters, which fall in successively lower categories, the related thyratrons will fire and close their associated relays. Similarly if wheel 12 senses a section of the suture which violates more than one additional category, all of the related thyratrons will fire substantially simultaneously. For the purpose of this example, it will be assumed that the particular suture causes only thyratrons $T_1$ and $T_2$ to fire before it leaves the gauging wheels, and this information is therefore temporarily stored by the closed relays $R_1$ and $R_2$.

As the trailing end of the suture leaves the gauging nip, the wheels 12–13 quickly close to their zero position and thus in fact establish conditions causing all remaining thyratrons to fire. However, as soon as the wheels pass the setting of the gating circuit containing potentiometer P, triode T changes to non-conducting condition, and its plate relay R immediately drops out. This removes the power from all the thyratron plate circuits by breaking the line 90 at the relay contacts 96, and since the plate relays $R_3$–$R_n$ have not yet closed due to the delay caused by their associated condensers $C_3$–$C_n$, the resulting immediate extinguishing of the thyratrons $T_3$–$T_n$ breaks the energizing circuits for relays $R_3$–$R_n$ before they can close and so holds them open.

At this instant in the cycle, the energizing circuits for the closed relays $R_1$ and $R_2$ are also broken, but these relays are delayed in reopening by the charge in their associated condensers $C_1$ and $C_2$, and their front contacts therefore remain closed in circuit with the line 101. At the same instant, this line is connected to power by the closing of the back contacts 102 of relay R, and this in turn supplies power through relays $R_1$ and $R_2$ for energizing their associated transfer relays $TR_1$ and $TR_2$. The effect of this part of the cycle is therefore to transfer to the appropriate transfer relays the correct information which had been stored by their associated thyratrons, and at the same time to block transfer of information from the remaining thyratrons even though they had been erroneously fired at the instant when the suture left the gauging nip.

In the suture sorting system as described, some time interval must elapse between departure of the trailing end of the suture from the gauging nip and the entry of its leading end to the sorting station 16, since it is not until the gate triode T operates to cut off further detecting action that the information is made available to the sorting station as to the proper category into which the particular suture is to be directed. It is therefore necessary that those transfer relays which have closed remain closed during such time interval, and their associated storage relays cannot as a practical matter be held closed long enough for this result because they must reopen as part of the resetting of the detecting system for operation on the next suture to be gauged. FIG. 5 accordingly shows the transfer relays as self-locking through a timer 105 which may be of any conventional type capable of being started by an appropriate signal simultaneously with closing of one or more of the transfer relays. This arrangement, however, is subject to wide variation within conventional practice, and one simple modification would be to use transfer relays which themselves have a timer action causing a delay in their opening following deenergization, in which event the separate timer would be unnecessary.

As previously noted, the several solenoids $S_1$–$S_n$ may operate to control sorting devices in the sorting station 16 which will selectively direct the successive sutures to the operating categories in the collecting station 19. They could equally well perform other functions, such as counting, either in place of or in conjunction with sorting functions. Similarly, the transfer relays could be provided with additional connections for performing additional functions such as counting and/or operating solenoids corresponding to the solenoids A6, B6, C6 and R6 in the above noted Schwartz patent.

While the foregoing description has been in connection with the measurement of minimum diameters, the invention is equally adapted to the measurement of maximum dimensions, either above or in combination with corresponding minimum dimensions. For example, the illustrated apparatus and wiring diagram can be adapted to the measurement of maximum diameters of sutures by merely reversing the leads to the primary and secondary coils of the differential transformer 55, possibly along with regulation of the phase adjustment 73, and the potentiometers $P$–$P_n$ may be adjusted as required to provide the desired dimensional categories as already described.

If it is desired to measure minimum and maximum diameters simultaneously, for example to classify sutures according to categories having upper and lower limits as described in the above Schwartz patent, some further modification of the apparatus is required over what has heretofore been described. A simple manner of accomplishing this result is to add a second differential transformer 55′ in tandem with the transformer 55, as shown in FIG. 6, provided with its own control circuits 14′ which may be identical with the circuits 14 except for the reversal of the leads to the coils of whichever transformer is to gauge maximum diameters. The lines 17′ may then be connected to their related lines 17 and correspond in function to the lines A3, B3 etc. in the Schwartz patent. Many such variations of the work ultimately performed by the apparatus of the invention are possible, depending upon the particular nature of the dimension or other variable condition being gauged and recorded, and it will also be apparent that although the invention is especially applicable in conjunction with a continuously variable dynamic condition, it can be employed in conjunction with static conditions.

While the forms of apparatus herein described constitute preferred embodiments of the invention, it is to be understood that the invention is not limited to these precise forms of apparatus, and that changes may be made therein without departing from the scope of the invention which is defined in the appended claims.

We claim:

1. In apparatus for classifying a plurality of successive sutures according to the minimum cross sectional dimension thereof including means for conveying successive sutures along a predetermined path past sensing means responsive to the diameter of said sutures providing signals representing such diameters to a controllable sorting station at the end of such path, the improvement comprising a plurality of holding circuits connected to receive signals representing thickness from said sensing means and each operable to go into a state of conduction according to predetermined finite minimum thicknesses of a suture being gauged temporarily storing said thickness information, a separate D.C. operated transfer relay associated with each said circuit, means applying operating power to each of said transfer relays for operation through each said associated circuit in the conductive state thereof subsequent to the passage of said suture past said sensing means, and means on said sorting station connected for operation by said relays for directing each such suture according to the minimum dimension thereof as represented by a relay operated through said circuits.

2. In apparatus for classifying a plurality of successive sutures according to the minimum cross sectional dimension thereof including means for conveying successive sutures along a predetermined path past sensing means responsive to the diameter of said sutures providing signals representing such diameters to a controllable sorting station at the end of such path, the improvement comprising a plurality of thyratron holding circuits each including a thyratron and a series connected relay connected to receive signals representing thickness from said sensing means and each operable to close its associated said relay according to predetermined finite minimum thicknesses of a suture being gauged, a separate transfer relay associated with each said circuit, contact means on each of said series connected relays connected when energized to apply operating power to said transfer relays, and solenoid means on said sorting station connected for operation by said transfer relays for directing each such suture according to the minimum dimension thereof as represented by a transfer relay operated through said circuits.

3. In apparatus for classifying a plurality of successive sutures according to the minimum cross sectional dimension thereof including means for conveying successive sutures along a predetermined path past sensing means responsive to the diameter of said sutures providing signals representing such diameters to a controllable sorting station at the end of such path, the improvement comprising a plurality of holding circuits including thyratrons connected for operation by said sensing means according to finite gradations of minimum thicknesses of a suture being gauged, a series connected relay operated by each of said thyratrons, transfer relays connected for operation through closed contacts of each of said series connected relays, means on said sorting station connected for operation by said transfer relays for directing each such suture according to the ones of said relays operated by said circuits, and delay means connected to said transfer relays to delay the release thereof providing time for the travel of said sutures to said sorting station.

4. In apparatus for classifying a plurality of successive sutures according to the minimum cross sectional dimension thereof including means for conveying successive sutures along a predetermined path past sensing means responsive to the diameter of said sutures providing signals representing such diameters to a controllable sorting station at the end of such path, the improvement comprising a plurality of holding circuits connected for conduction by said sensing means signals according to finite minimum thicknesses of a suture gauged thereby, a separate transfer relay connected for operation by each of said circuits, means connected to said transfer relays to operate said sorting station for directing each such suture according to the ones of said relays operated through said circuits, power control means for said transfer relays preventing the closing of said relays until the passing of the trailing edge of each such suture past said sensing means and thereafter effective to energize said transfer relays through said holding circuits, and delay means connected to said relays providing for the delayed release thereof providing time for the travel of said sutures to said sorting station.

References Cited in the file of this patent
UNITED STATES PATENTS

| | | |
|---|---|---|
| 2,312,357 | Odquist et al. | Mar. 2, 1943 |
| 2,937,749 | Strzala | May 24, 1960 |
| 3,023,899 | Valentine et al. | Mar. 6, 1962 |
| 3,049,978 | Miles et al. | Aug. 21, 1962 |